United States Patent
Kersey et al.

(10) Patent No.: US 10,099,251 B2
(45) Date of Patent: Oct. 16, 2018

(54) RE-LINED PIPE TECHNIQUE FOR WEAR MITIGATION IN SLURRY TRANSPORT PIPELINE

(71) Applicant: CiDRA COPORATE SERVICES INC., Wallingford, CT (US)

(72) Inventors: Alan D. Kersey, South Glastonbury, CT (US); Mark R. Fernald, Enfield, CT (US); John Viega, Ellington, CT (US); Francis K. Didden, Wallingord, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 0 days.

(21) Appl. No.: 15/583,061

(22) Filed: May 1, 2017

(65) Prior Publication Data
US 2017/0234476 A1 Aug. 17, 2017

Related U.S. Application Data

(62) Division of application No. 14/350,666, filed as application No. PCT/US2012/060805 on Oct. 18, 2012, now abandoned.
(Continued)

(51) Int. Cl.
*B05D 7/22* (2006.01)
*B05D 3/06* (2006.01)
(Continued)

(52) U.S. Cl.
CPC ............. *B05D 7/222* (2013.01); *B05C 9/12* (2013.01); *B05D 1/02* (2013.01); *B05D 3/067* (2013.01);
(Continued)

(58) Field of Classification Search
CPC ................................ B05D 7/222; B05D 7/227
USPC .................................................. 427/230–239
See application file for complete search history.

(56) References Cited

U.S. PATENT DOCUMENTS 3,895,604 A * 7/1975 Ryan ...................... B05B 13/06
                                                          118/306
5,150,493 A    9/1992 Sivacoe
(Continued)

FOREIGN PATENT DOCUMENTS

| GB | 2 226 865 A * | 2/1990 |
| GB | 2226865 | 7/1990 |
| KR | 20070082130 | 8/2007 |

OTHER PUBLICATIONS

O'Keefe et ai, "Application of Passive Sonar Technology to Minerals Processing and Oil Sands Applications," presented at CMP 2007,Jan. 24, 2007 (Jan. 24, 2007), [available online at: http://cidra.com/Resource%20Center/CiORA%20Manuals/application-passive-sonar-technology-minerals-processing-and-oil-sands: accessed on Jan. 25, 2013 (Jan. 25, 2013)]; p. 21, second and third full paragraphs.
(Continued)

*Primary Examiner* — William P Fletcher, III
(74) *Attorney, Agent, or Firm* — Ware, Fressola, Maguire & Barber LLP

(57) ABSTRACT

The present invention provides apparatus, including a pigging tool, that comprises a spraying mechanism configured to move along an inner surface of a pipeline, including a slurry transport pipeline in a minable oilsands facility or plant, and to spray a coating on the inner surface of the pipeline; and a curing source, including an ultraviolet (UV) light source, a microwave source or an RF source, configured to cure the coating sprayed on the inner surface of the pipeline in situ as the spray mechanism moves along the inner surface of the pipeline.

7 Claims, 2 Drawing Sheets

Pipe wear reduction using a re-lining process based on an abrasion-resistant polymer coating coated and polymerized in-situ in pipeline.

Related U.S. Application Data

(60) Provisional application No. 61/548,492, filed on Oct. 18, 2011.

(51) Int. Cl.
*B05D 1/02* (2006.01)
*F16L 58/10* (2006.01)
*F16L 55/164* (2006.01)
*F16L 55/26* (2006.01)
*B05C 9/12* (2006.01)
*F16L 101/16* (2006.01)

(52) U.S. Cl.
CPC ............ *F16L 55/164* (2013.01); *F16L 55/26* (2013.01); *F16L 58/1027* (2013.01); *F16L 2101/16* (2013.01)

(56) References Cited

U.S. PATENT DOCUMENTS

| | | |
|---|---|---|
| 5,930,744 A | 7/1999 | Koch et al. |
| 6,468,350 B1 * | 10/2002 | Hillenbrand .............. B05C 9/14 118/207 |
| 7,726,256 B1 | 6/2010 | Weisenberg |
| 2010/0051168 A1 | 3/2010 | Moeskjaer |
| 2011/0097486 A1 * | 4/2011 | Weisenberg ........ B05B 13/0636 427/236 |

OTHER PUBLICATIONS

English Language Abstract of KR20070082130.

* cited by examiner

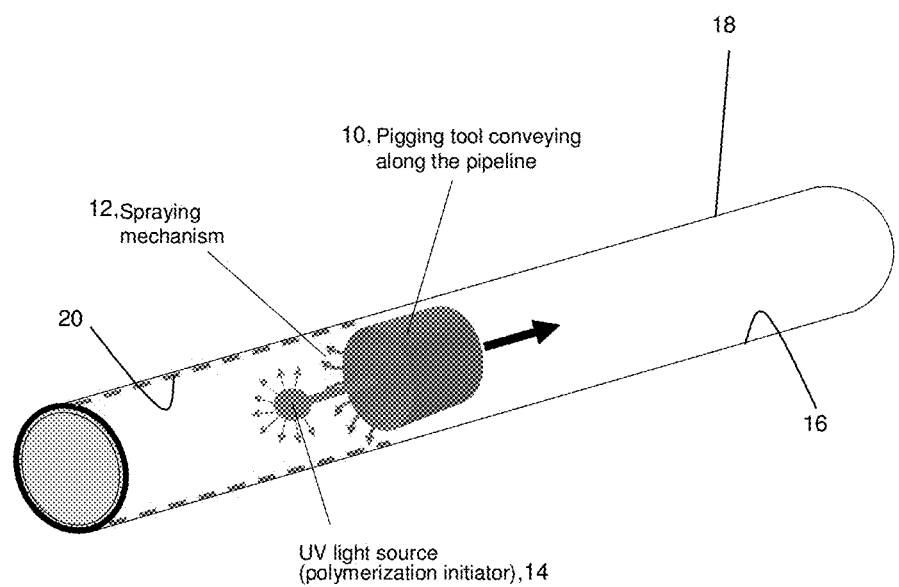
Figure 1. Pipe wear reduction using a re-lining process based on an abrasion-resistant polymer coating coated and polymerized in-situ in pipeline.

Apparatus 30

Signal processor 30a configured to provide signalling to move a spraying mechanism along an inner surface of a pipeline, including a slurry transport pipeline in a minable oilsands facility or plant, and spray a coating on the inner surface of the pipeline; and cure with a curing source, e.g., including an ultraviolet (UV) light source, a microwave source or an RF source, the coating sprayed on the inner surface of the pipeline in situ as the spray mechanism moves along the inner surface of the pipeline.

Other modules 30b for implementing the signal processing functionality, including a memory module, busing architecture and input/output modules

Figure 2

RE-LINED PIPE TECHNIQUE FOR WEAR MITIGATION IN SLURRY TRANSPORT PIPELINE

CROSS-REFERENCE TO RELATED APPLICATION

This application is a Divisional application of, and claims benefit to, patent application Ser. No. 14/350,666, filed 9 Apr. 2014, abandoned, which is the National Stage entry of PCT/US2012/060805, filed 18 Oct. 2012, which itself claims benefit to Provisional Patent Application Ser. No. 61/548,492, filed 18 Oct. 2011, which are all hereby incorporated by reference in their entirety.

BACKGROUND OF THE INVENTION

1. Field of Invention

This invention relates to a technique for wear mitigation in a pipeline; and more particularly to a method and apparatus for re-lining a slurry transport pipeline for wear mitigation.

2. Description of Related Art

To overcome the significant wear that can occur in pipelines carrying slurry materials, particularly as in the mineable oil sands industry, many producers are adopting 'lined' carbon steel pipes in the most aggressive slurries, for example coarse tailings. These steel pipes are lined with materials such as urethane with other elastomers. For example, one known lined pipe, such as Iracore International's Irathane® lined pipe, combines a thin layer of rubber against the inside wall of the pipe, for compliance, with a thicker layer of urethane-like material (Irathane®) over the rubber liner. While these materials provide good resistance to abrasion, and have projected lifetimes of 10 years, ultrasonic non-destructive examination (NDE) approaches to detecting the lining wear (wall thickness) may be compromised, and in some cases are not possible, due to the poor impedance discrimination between the steel and various liners (as compared to pipes having just steel). Consequently, monitoring the wear rates and status of a lined pipe is both a challenge and a risk to the producer, as catastrophic failure can occur, e.g., if the liner wears to the point of reaching the carbon steel pipe, or if the liner is damaged and tears away from the outer steel pipe, exposing it directly to the abrasive slurry. This type of failure can result in loss of containment which could have environmental and safety implications as well as introducing high opportunity costs due to lost production In view of this, there is a need in the industry to provide a technique for re-lining a pipeline, e.g., including a technique that does not preclude ultrasonic non-destructive examination (NDE) approaches for detecting the lining wear (wall thickness) to be implemented after the pipeline is re-lined as part of a routine maintenance schedule, which is a problem with liners known and used in the prior art.

SUMMARY OF THE INVENTION

In summary, the present invention provides a technique in which the wear in a pipe or pipeline is mitigated by the use of a so-called "sacrificial" coating re-applied each time the pipeline undergoes a scheduled maintenance shutdown. For example, during such a shut-down the pipe or pipeline may be cleaned using known 'pigging' technology, and then a subsequent pigging tool may be introduced to the pipeline which allows for the spray-coat application of a coating, such as a polymer coating, which is then cured (polymerized) in-situ. The coating is configured to have a high degree of abrasion-resistance, and thus this determines potential coatings that may be applied. Some polymers may be used and designed to take on the electro-mechanical qualities of 'bridging groups' incorporated into the monomer structure. As an example, polymers can be made to be electrically conducting, or magnetic, or have particular chemical affinities etc., or some combination thereof The mechanical properties and hardness of the polymer that may be used can also be controlled, enabling coatings that exhibit a high abrasion and wear resistance.

In particular, the apparatus according to some embodiments of the present invention, may include, or take the form of, a spraying mechanism in combination with a curing source, e.g., including an ultraviolet (UV) light source, an microwave source, or an RF source. The spraying mechanism may be configured to move along an inner surface of a pipeline, including a slurry transport pipeline in a minable oilsands facility or plant, and to spray a coating on the inner surface of the pipeline. The curing source may be configured to cure the coating sprayed on the inner surface of the pipeline in situ as the spray mechanism moves along the inner surface of the pipeline.

The apparatus according to the present invention may include one or more of the following features:

The apparatus may be configured as, or forms part of, a pipe pigging tool.

The coating may be a monomer coating, which is understood to be a chemical compound that can undergo polymerization, e.g., by exposing it to a UV light source.

The coating may be a polymer coating that is polymerized, e.g., by the UV light source, where a polymer is understood to be a chemical compound or mixture of compounds formed by polymerization and consisting essentially of repeating structural units. The polymer coating may be designed to take on electro-mechanical qualities of 'bridging groups' incorporated into a monomer structure. The polymer coating may be configured to have one or more characteristics or properties, including being electrically conducting, or magnetic, or having particular chemical affinities, or some combination thereof.

The coating may have a high degree of abrasion and wear resistance.

The coating may be configured and sprayed on the inner surface of the pipeline so as to form an impedance discrimination between the pipeline and the coating, e.g., that does not preclude ultrasonic non-destructive examination (NDE) approaches for detecting lining wear or wall thickness, which was a problem with liner known and used in the prior art.

The apparatus may also include a signal processor configured to provide signalling to
- move the spraying mechanism along the inner surface of the pipeline and spray the coating on the inner surface of the pipeline; and
- cure with the curing source (e.g., including the ultraviolet (UV) light source, the microwave source or the RF source) the coating sprayed on the inner surface of the pipeline in situ as the spray mechanism moves along the inner surface of the pipeline.

The signal processor may be incorporated in the apparatus, such as the pigging tool. Alternatively, the signal processor may form part of a remotely operated controller, and the signalling may include, or takes the form of, wireless signaling provided to the pigging tool.

The Method

Further, the present invention may also take the form of a method comprising steps of moving the spraying mechanism along the inner surface of the pipeline, including the slurry transport pipeline in the minable oilsands facility or plant, and spraying the coating on the inner surface of the pipeline; and curing with the curing source (e.g., including the ultraviolet (UV) light source, the microwave source or the RF source) the coating sprayed on the inner surface of the pipeline in situ as the spray mechanism moves along the inner surface of the pipeline.

The method according to the present invention may include one or more of the following features:

The method may include initially cleaning the inner surface of pipeline, including using 'pigging' technology.

The method may include spraying a monomer coating, then polymerizing the monomer coating, e.g., via the UV irradiation.

The method may include using the technique, e.g., on a pipeline that may form part of oilsands processing technology.

The method may be performed as part of a scheduled maintenance program, including during a shut-down, where the pipeline is cleaned using the 'pigging' technology, and then a subsequent pigging tool may be introduced to the pipeline which allows for a spray-coat application of the coating, such as a polymer coating, which is then cured in-situ.

The Signal Processor

Furthermore, the apparatus according to some embodiments of the present invention, may include, or take the form of, the signal processor that is configured to provide the signalling to move the spraying mechanism along the inner surface of the pipeline, including the slurry transport pipeline in the minable oilsands facility or plant, and spray the coating on the inner surface of the pipeline; and cure with the curing source (e.g., including the ultraviolet (UV) light source, the microwave source or the RF source) the coating sprayed on the inner surface of the pipeline in situ as the spray mechanism moves along the inner surface of the pipeline.

BRIEF DESCRIPTION OF THE DRAWING

The drawing includes FIGS. 1-2, which are not necessarily drawn to scale, as follows:

FIG. 1 shows apparatus for re-lining a pipeline, according to some embodiments of the present invention.

FIG. 2 shows a signal processor for implementing the apparatus shown in FIG. 1, according to some embodiments of the present invention.

DETAILED DESCRIPTION OF BEST MODE OF THE INVENTION

FIG. 1

In the technique according to the present invention, a so-called "sacrificial" coating may be applied to normal high wear pipes, e.g., such as mild steel (carbon steel) pipes, to provide an "abrasion barrier." This coating may be applied using a pipe "pigging tool" that traverses the pipeline and applies the coating compound and polymerizes the coating as it passes down the pipe. FIG. 1 shows the concept and principle of operation of the technique, according to some embodiments of the present invention. The pipeline, used for example in coarse tailings transport, may be cleaned using an initial pass by a pigging tool, then a tool designed to spray-coat the inner surface of the pipe with the monomer coating, then polymerize the coating via a UV irradiation, according to the present invention. The subsequent coating, while possibly even being thin, is designed to have sufficient wear resistance to allow the pipeline to be operated, e.g., for at least 6 months, and/or to the next scheduled shutdown, without the slurry wearing through the coating and thus wearing directly the steel pipe.

In particular, FIG. 1 shows the apparatus generally indicated as 10 which includes a spraying mechanism 12 in combination with a light source 14, including an ultraviolet (UV) light source. The apparatus 10 may be configured as, or forms part of, a pipe pigging tool, although the scope of the invention is not intended to be limited to any particular implementation in any particular tool either now known or later developed in the future. The spraying mechanism 12 may be configured to move along an inner surface 16 of a pipeline 18, e.g., including a slurry transport pipeline in a minable oilsands facility or plant (not shown), and spray a coating 20 (indicated as dashed lines in FIG. 1) on the inner surface 16 of the pipeline 18. The light source 14 may be configured to cure the coating 20 sprayed on the inner surface 16 of the pipeline 18 in situ as the spray mechanism 12 moves along the inner surface 16 of the pipeline 18. Light sources, including UV light sources, are known in the art, and the scope of the invention is not intended to be limited to any particular type or kind thereof either now known or later developed in the future. The scope of the invention is not intended to be limited to curing the coating 20 using a UV light source like element 14. For example, other types or kinds of curing sources may be used that are now known or later developed in the future, including a microwave source or an RF source.

The coating 16 may be a monomer coating, which can undergo polymerization, e.g., by exposing it to a UV light source. Monomer are known in the art, and the scope of the invention is intended to be limited to any particular type or kind thereof either now known or later developed in the future. The coating 16 may be configured or designed to take on electro-mechanical qualities of 'bridging groups' incorporated into a monomer structure.

The coating 16 may be configured to have a high degree of abrasion and wear resistance, based at least partly on a particular application in a particular pipeline, and/or on a particular scheduling associated with a particular maintenance program. The scope of the invention is not intended to be limited to any particular degree of abrasion resistance of the applied coating.

The coating 16 may be configured and sprayed on the inner surface 16 of the pipeline 18 so as to form an impedance discrimination and/or characteristic between the pipeline 18 and the coating 16, e.g., that does not preclude ultrasonic non-destructive examination (NDE) approaches for detecting lining wear or wall thickness, including using the NDE technique set forth below. The whole thrust of the present invention is to provide a technique that allows the liner to be replaced based on a liner maintenance cycle—6 to 12 months. One benefit of the technique according to the present invention is that NDE approaches may still be used. It is also noteworthy that NDE/Haol can be used to ensure the steel pipe is not being eroded, according to some embodiments of the present invention.

By way of example, in the oil sands industry pipe maintenance scheduling may be regularly scheduled on approximately 6 month cycles. During the maintenance of a given pipeline, which may involve for example rotation of sections of the pipe to mitigate pipe wear, flow may be diverted to a 'swing', or parallel line which during normal operations may be generally inactive. Consequently, approximately at each 6 months, or scheduling period, the flow may be alternated between the producer line and the 'swing' line, allowing the producer line to be 'refurbished' with this applied coating, according to the present invention.

The approach according to the present invention has the advantage over other techniques for coatings in that the steel pipe is retained as a primary flow pipe, and thus the mechanical integrity is maintained. NDE sensors designed to measure the pipe-wall thickness, e.g., such as known techniques and monitoring devices provided in the marketplace in conjunction, e.g. with the trademark HALO® system by the assignee of the instant patent application, can be used to monitor the performance of the so-called "sacrificial" coating and ensure that the steel wall is not being abraded significantly. By way of example, see the NDE techniques disclosed in PCT application No. PCT/US11/28957, filed 18 Mar. 2011, entitled "Method and Apparatus for Monitoring of Components Housing Wall Thickness and Wear Monitoring," that claims benefit to provisional patent application No. 61/315,233, filed 18 Mar. 2010, which are both incorporated herein by reference in their entirety. See also the corresponding U.S. national stage patent application Ser. No. 13/635,449, filed 17 Sep. 2012, which is also incorporated herein by reference in its entirety. For the purpose of understanding the present invention, the scope thereof is intended to include other types or kinds of NDE either now known or later developed in the future. It is believed that a combination of the so-called "sacrificial" coating, periodic rotation and monitoring may improve the carbon steel pipeline lifetime by 3 to 5 fold compared to the use of known standard uncoated steel pipes known in the art. In addition, since the wall thickness of the coated pipe can be measured, the risk of uncertainty to the operator may be substantially mitigated, reduced and controlled.

FIG. 2: The Signal Processor

FIG. 2 shows, by way of example, apparatus generally indicated as 30 according to some embodiments of the present invention in the form of a signal processor 30a that may be configured to provide the signalling to move the spraying mechanism 12 along the inner surface 16 of the pipeline 18, including a slurry transport pipeline in the minable oilsands facility or plant (not shown), and spray the coating 20 on the inner surface 16 of the pipeline 18; and cure with the light source 14 (including the ultraviolet (UV) light source, the microwave source or the RF source) the coating 20 sprayed on the inner surface 16 of the pipeline 18 in situ as the spray mechanism 12 moves along the inner surface 16 of the pipeline 18.

By way of example, and consistent with that described herein, the functionality of the signal processor 30a may be implemented using hardware, software, firmware, or a combination thereof, although the scope of the invention is not intended to be limited to any particular embodiment thereof. In a typical software implementation, the signal processor 30a would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the signal processor 20 being a stand alone module, as shown, or in the combination with other circuitry for implementing another module. Moreover, the real-time part may be implemented in hardware, while non real-time part may be done in software.

The apparatus 30 is also understood to include one or more other modules 30b for implementing the signal processing functionality, including one or more memory modules, busing architecture, and/or input/output modules.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for re-lining an inner surface of a slurry transport pipeline in a minable oilsands facility or plant, comprising:
   moving a pigging tool having a spraying mechanism and a curing source along an inner surface of a slurry transport pipeline in a minable oilsands facility or plant;
   spraying with the spraying mechanism an abrasion-resistant coating on the inner surface of the slurry transport pipeline;
   polymerizing with the curing source, including an ultraviolet (UV) light source, a microwave source or a radio frequency (RF) source, the abrasion-resistant coating sprayed on the inner surface of the slurry transport pipeline in situ as the spray mechanism moves along the inner surface of the slurry transport pipeline; and
   controlling the operation of the pigging tool with a remotely operated controller having a signal processor configured to provide wireless signaling to
      move the spraying mechanism along the inner surface of the slurry transport pipeline and spray the abrasion-resistant coating on the inner surface of the slurry transport pipeline, and
      cure with the curing source the abrasion-resistant coating sprayed on the inner surface of the slurry transport pipeline in situ as the spray mechanism moves along the inner surface of the slurry transport pipeline.

2. A method according to claim 1, wherein the method comprises initially cleaning the inner surface of the slurry transport pipeline.

3. A method according to claim 1, wherein the method comprises spraying a monomer coating, then polymerizing the coating via the UV irradiation.

4. A method according to claim 1, wherein the method is performed as part of a scheduled maintenance program, including during a shut-down, where the slurry transport pipeline is cleaned using 'pigging' technology, and then a subsequent pigging tool is introduced to the pipeline which allows for a spray-coat application of the abrasion-resistant coating, which is then cured in-situ.

5. A method according to claims 4, wherein the method includes using a polymer coating as the abrasion-resistant coating.

6. A method according to claim 1, wherein the method comprising choosing the abrasion-resistant coating so as to form an impedance discrimination or characteristic between the slurry transport pipeline and the abrasion-resistant coating that does not preclude ultrasonic non-destructive testing examination (NDE) approaches for detecting liner wear and wall thickness.

7. A method according to claim 1, wherein the abrasion-resistant coating includes NDE/Haol to ensure that any slurry transport pipeline made of steel is not being eroded.

* * * * *